UNITED STATES PATENT OFFICE.

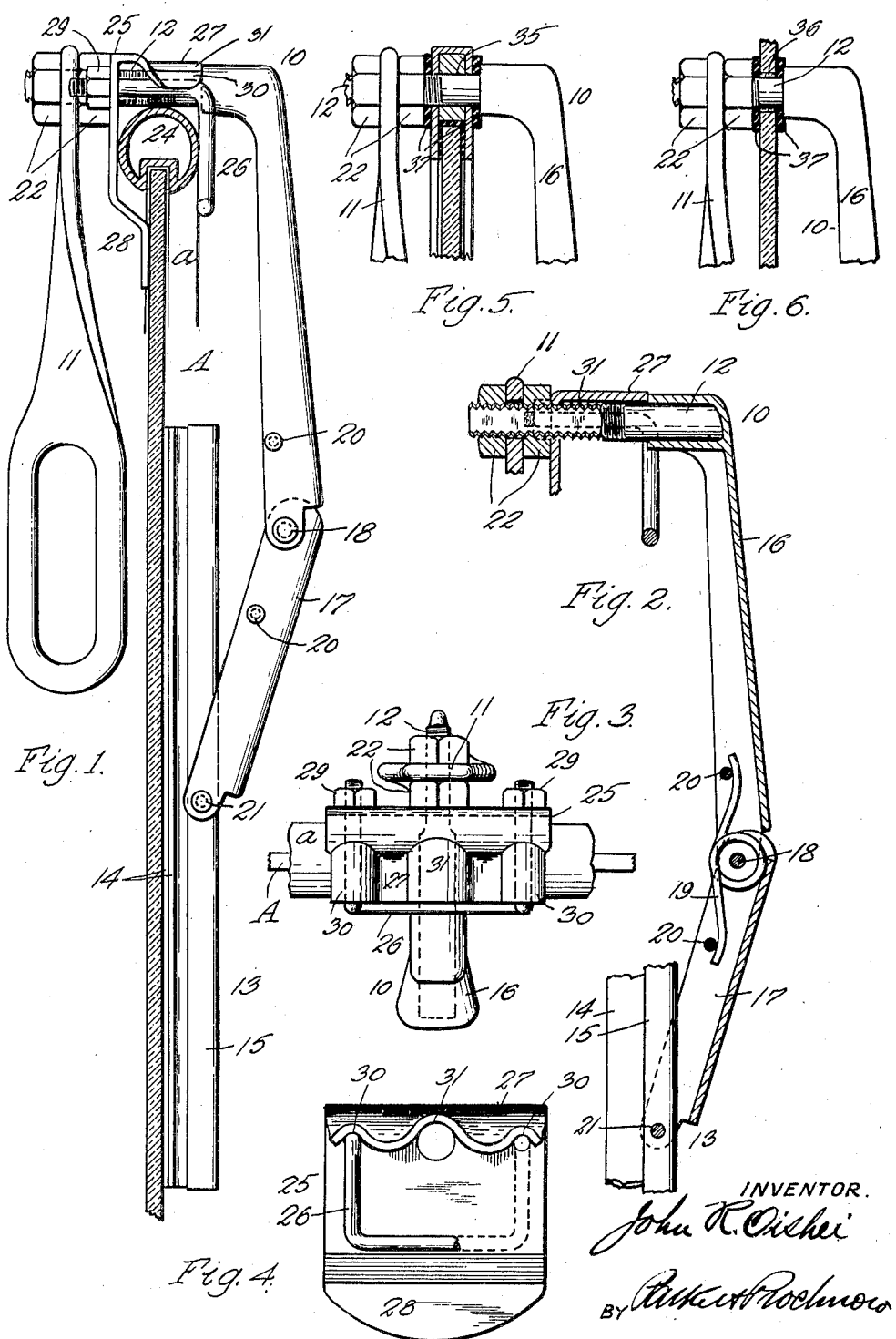

JOHN R. OISHEI, OF BUFFALO, NEW YORK.

CLEANER FOR WINDSHIELDS AND THE LIKE.

1,362,175.           Specification of Letters Patent.     Patented Dec. 14, 1920.

Application filed February 18, 1920. Serial No. 359,502.

*To all whom it may concern:*

Be it known that I, JOHN R. OISHEI, a citizen of the United States, residing at Buffalo, in the county of Erie and State of New York, have invented a new and useful Improvement in Cleaners for Windshields and the like, of which the following is a specification.

This invention relates more particularly to swinging cleaners of the kind which are pivotally mounted on the windshields of automobiles so that the cleaner can be swung in an arc of a circle over the face of the windshield glass for cleaning or wiping the same. The cleaner is not, however, restricted to use on windshields. These swinging cleaners usually comprise an arm at the front side of the windshield which carries the wiping member, and an arm at the rear side of the windshield which serves as a handle for swinging the cleaner. The cleaners have been pivotally mounted in various different ways on the windshields. In some cases the cleaner is pivoted on a clamp or securing device which is adapted to be detachably secured on the frame of the windshield. In others the pivot or shaft of the cleaner passes through and is adapted to turn in a hole extending through the frame of the windshield, and in still others the pivot of the cleaner extends through and is adapted to turn in a hole drilled through the windshield glass. In some of these devices the operating arm at the rear side of the windshield has a part or roller which is held by spring pressure against the glass to produce the necessary pressure of the wiping member against the outer face of the glass, but such constructions are objectionable since the part thereof which rubs against the glass in operating the cleaner leaves an objectionable mark on the glass.

The objects of this invention are to provide a windshield or window cleaner of the swinging type, which is of practical construction and attractive appearance and is adapted to be readily mounted for use either by a clamp secured on the frame of the windshield or with its pivot shaft extending through a bearing hole in either the frame or the glass of the windshield; also to provide the device with a simple and reliable clamp which will securely retain the cleaner in proper position on the frame; also to rigidly connect the carrying arm for the wiper member and the operating arm or handle to the pivot shaft and provide the wiper carrying arm with a hinged spring-pressed section by which the wiper is pressed firmly against the face of the glass without necessitating the operating arm or handle to engage the glass to give the necessary pressure on the wiper; and also to improve windshield cleaners in the other respects hereinafter described and set forth in the claims.

In the accompanying drawings:

Figure 1 is a side elevation of a windshield cleaner embodying the invention, showing the same applied to a windshield, the upper portion of which is shown in section.

Fig. 2 is a broken sectional elevation of the cleaner detached.

Fig. 3 is a plan view of the cleaner.

Fig. 4 is a front elevation of the clamp for securing the cleaner on the windshield frame.

Fig. 5 is a fragmentary sectional elevation showing the cleaner shaft secured in a hole passing through the frame of the windshield.

Fig. 6 is a similar view showing the shaft of the cleaner passing through a hole in the windshield glass.

A, Fig. 1, represents the upper portion of the glass of the windshield and *a* the frame thereof.

The windshield cleaner comprises a wiper-carrying arm 10 and an operating arm or handle 11, which are connected by a pivot shaft 12 and are adapted to extend respectively in front and in rear of the glass of the windshield, and a wiper or rubber 13 which is pivoted between its end on the carrying arm and is adapted to contact with the front face of the windshield glass. The wiper or rubber may be of any usual or suitable construction, that shown consisting of one or more flexible strips 14 of rubber or other suitable material adapted to clean the glass, and a channel-shaped metal holding strip 15 in which the rubber strip or strips is or are secured.

The wiper arm 10 has a rigid, inner section 16 which is welded or rigidly secured on the front end of the pivot shaft in any suitable manner, and an outer section 17 which is hinged to the free end of the inner section, and on which the wiper is pivoted. Preferably, both sections of the wiper arm are of channel shape in cross section and made of sheet metal bent into form, and the adjacent ends of the two sections overlap and are hinged together by a rivet 18 passing through perforations in the flanges of the two sections of the arm. The hinged section of the wiper arm is pressed inwardly toward the windshield glass by a suitable spring 19, which preferably consists of a wire coiled about the hinge pin 18 and bearing at its ends against cross pins 20 on the two arm sections. The wiper arm is arranged with its channel facing the windshield and the spring is inclosed and hidden from view in the channel of the arm. When the cleaner is applied to the windshield the inner arm section is held rigidly from tipping toward or from the windshield, and the free end of the hinged section of the arm and the wiper pivoted thereon are pressed inwardly by the spring 19 so that the wiper is pressed firmly against the face of the glass. The wiper is pivoted, as by a rivet 21 between the flanges of the hinged arm section.

The operating arm or handle 11 of the device preferably consists of a flat metal bar which is twisted so that its opposite ends stand at right angles to each other and its outer end extends in a plane at right angles to the windshield glass. This handle is preferably secured on the pivot shaft 12 between nuts 22 which are screwed on the threaded, rear end of the shaft, one inside and the other outside of the handle. The handle is prevented from turning on the shaft by making the rear end of the shaft and the hole therefor in the handle of non-circular shape.

As shown in Figs. 1–4, the cleaner is pivoted on a clamp which is detachably clamped on the upper bar 24 of the frame of the windshield. This clamp preferably comprises a sheet metal member 25 and a bolt member 26 adapted to straddle and grip the frame bar. The member 25 stands upright at the rear of the frame bar and has an upper end or flange 27 which projects forwardly over the top of the frame bar, and an inbent, lower end 28 which is adapted to bear against the windshield glass below the frame bar. The member 26 of the clamp consists of a U-bolt which is bent to form an upright portion which depends in front of the frame bar, and two upper shanks which project rearwardly over the top of the frame bar and pass through holes in the upright part of the other clamp member 25. The ends of the shanks are screw-threaded and receive nuts 29 which are adapted to be turned for drawing the two parts of the clamp toward each other to grip the frames between them. The horizontal top piece 27 of the clamp member 25 is shaped to form at its ends two seats 30 in which the horizontal shanks of the U-bolt rest and are held from tipping or swinging laterally, and an open seat or bearing 31 between the seats 30 in which the pivot shaft 12 of the cleaner is adapted to bear. When the clamp members are drawn toward each other to grip the frame bar by tightening the nuts 29, the pressure of the bar against the depending part of the U-bolt presses the shanks up firmly into their seats 30 and the two members of the clamp are held from tipping or swinging relatively to each other. The pressure of the wiper against the windshield also presses the pivot shaft firmly into its bearing seat 31 and this pressure also causes the inbent, lower end 28 of the clamp member 25 to bear against the windshield glass, which effectually prevents the clamp from tipping or turning on the frame bar even if the faces of the latter are convex. The clamp, therefore, while of simple and inexpensive construction, nevertheless provides a reliable and secure attaching means for mounting the cleaner on the windshield.

When it is desired to mount the cleaner to turn in a hole in the windshield frame or glass, the clamp 25—26 is removed from the pivot shaft 12 and the latter passed through a hole 35 in the frame, as shown in Fig. 5, or through a hole 36 in the glass, as shown in Fig. 6, the shaft being secured in the hole by screwing the nuts 22 on the shaft. Suitable washers 37 are preferably used on the shaft between the frame on the glass and the arm 10 and the inner nut 22 to prevent looseness and injury to the frame or glass.

I claim as my invention:

1. In a cleaner for windshields and the like, the combination of a pivot shaft mounted on and extending transversely of the windshield, an operating member secured to said shaft at one side of the windshield, an arm at the opposite side of the windshield comprising a rigid inner section fixed on said shaft, and an outer section hinged to the inner section, a wiper mounted on said hinged section, and a spring coöperating with said arm sections to press said hinged section and wiper toward the windshield.

2. In a cleaner for windshields and the like, the combination of a pivot shaft mounted on and extending transversely of the windshield, an operating member at one side of the windshield connected with said shaft, an arm at the opposite side of the windshield comprising an inner section rigid with said pivot shaft, and an outer section hinged to said inner section to swing toward the windshield, a wiper pivoted between its ends to swing perpendicularly to the windshield on the free end of said hinged arm-section, and a spring coöperating with said arm sections to press said hinged section and the wiper toward the windshield.

3. In a cleaner for windshields and the like, the combination of a pivot shaft mounted on and extending transversely of the windshield, an operating member secured to said shaft at one side of the windshield, an arm at the opposite side of the windshield comprising a rigid inner section fixed on said shaft, and an outer section hinged to the inner section, said arm sections being of channel shape cross section with the channel facing the windshield, a wiper mounted on said hinged section, and a spring located in said channel and acting to press the hinged section and wiper toward the windshield.

4. In a cleaner for windshields and the like, the combination of a pivot shaft extending transversely at one edge of the windshield, a wiper at one side of the windshield connected with said shaft, an operating member at the opposite side of the windshield connected with said shaft, a clamp comprising opposing members adapted to straddle and grip the edge of the windshield, one of said clamp members having a transversely extending shank rigid therewith, and said other clamp member being provided with transversely extending bearings for said shank and said pivot shaft and with an inner end arranged to bear against the windshield inwardly beyond the point where the clamp grips the windshield, and a spring which presses the wiper against the windshield and tends to hold said inner end of said clamp member against the windshield.

5. In a cleaner for windshields and the like, the combination of a clamp comprising an upright plate member and a bent bolt member adapted to straddle a frame bar of the windshield, said bolt having a shank extending over the frame bar and passing through a hole in said plate, and a pivot shaft passing through a hole in said plate, said plate having a flange overhanging the frame bar and provided with open bearing seats in which said bolt shank and shaft bear, an arm secured to one end of said shaft and carrying a wiper, and an operating member secured to the opposite end of said shaft.

6. In a cleaner for windshields and the like, the combination of a clamp comprising an upright plate member and a bent U-bolt member adapted to straddle a frame bar of the windshield, said U-bolt having shanks extending over the frame bar and passing through holes in said plate, a pivot shaft passing through a hole in said plate, said plate having a flange overhanging the frame bar and provided with open bearing seats in which said bolt shanks and shaft bear, an arm secured to one end of said shaft and carrying a wiper, and an operating member secured to the opposite end of said shaft.

7. In a cleaner for windshields and the like, the combination of a clamp comprising an upright plate member and a bent bolt member adapted to straddle a frame bar of a windshield, said bolt having a shank extending over the frame bar and passing through a hole in said plate, a pivot shaft passing through a hole in said plate, said plate having a flange overhanging the frame bar and provided with open bearing seats in which said bolt shank and shaft bear, an arm secured to one end of said shaft and carrying a wiper, a spring which presses said wiper against the windshield and holds said shaft in its bearing seat, and an operating member secured to the opposite end of said shaft.

8. In a cleaner for windshields and the like, the combination of a clamp comprising an upright plate member and a bent bolt member adapted to straddle a frame bar of the windshield, said bolt having a shank extending over the frame bar and passing through a hole in said plate, a pivot shaft passing through a hole in said plate, said plate having a flange overhanging the frame bar and provided with open bearing seats in which said bolt shank and shaft bear, and an inner end adapted to bear against the windshield glass inwardly beyond the frame bar, a spring which presses said wiper against the windshield and holds said shaft in its bearing seat, and an operating member secured to the opposite end of said shaft.

Witness my hand this 13 day of February, 1920.

JOHN R. OISHEI.

Witnesses:
CHARLES TESCHNER,
VALENTIN O'GRADY.